April 21, 1970   J. C. LOH   3,507,145
INDIUM SESQUIOXIDE THIN FILM COMBUSTIBLE GAS DETECTOR
Filed June 21, 1967

INVENTOR
JACK C. LOH

ATTORNEY

United States Patent Office 3,507,145
Patented Apr. 21, 1970

3,507,145
INDIUM SESQUIOXIDE THIN FILM COMBUSTIBLE GAS DETECTOR
Jack C. Loh, Peabody, Mass., assignor to General Electric Company, a corporation of New York
Continuation-in-part of application Ser. No. 596,869, Nov. 25, 1966. This application June 21, 1967, Ser. No. 647,735
Int. Cl. G01n 27/04
U.S. Cl. 73—23     4 Claims

ABSTRACT OF THE DISCLOSURE

A combustible gas detector. The resistance of a thin indium sesquioxide film on a dielectric support is monitored when the thin film is heated to a semiconductive region. Gas is directed over the thin film to vary the resistance of the semiconductive region.

BACKGROUND OF THE INVENTION

This application is a continuation-in-part of an application filed Nov. 25, 1966, Ser. No. 596,869, now abandoned, assigned to the same assignee as the present application.

This invention is directed to a gas detector for combustible gases and gases containing atomic hydrogen and more specifically to a gas detector using a thin film for a detecting medium.

Solutions to the problem of detecting gas leakage have resulted in several divergent approaches as illustrated by the following examples. In one detection scheme a reference gas and a sampled combustible gas are combined. As the mixture has a lower ion current than the reference gas when subjected to the output from an electron gun, the current is substantially proportional to the gas concentration. Although this type of detector is relatively sensitive to low gas concentrations, the requirements for a reference gas source and means for supplying a constant electric field and electron beam make a compact sensing unit practicably impossible.

In another gas detector, color changes of a heated filament, caused when a combustible gas is present, are sensed by a solar cell. This device was an improvement over flame detectors because it avoided the use of a flame in a combustible atmosphere and reliance on the resistance change of a filament-like member in the presence of a gas. In the solar cell scheme, radiant emission is used as a detector and this in turn controls a relay in an alarm circuit. Several characteristics of such a combustible gas detector tend to make it insensitive and unreliable. First, if a current surges through the filament, it glows brighter without the addition of a combustible gas, thereby providing an indication of a combustible gas. In addition, solar cells are not extremely sensitive to slight color changes caused by gas concentration variations.

In still another application a hot platinum wire changes resistance due to an exothermic reaction at a platinum catalyst surface. Although hot wires are relatively sensitive, reliability in terms of life is not good because the filament is raised to a high temperature which tends to shorten the life of the platinum wire. In addition, the platinum hot wire detector sensitivity is limited to a range between low concentrations and the explosive limit of the gas.

Another combustible gas detector system which provides complete coverage of gas concentrations includes a pair of thermocouples in a bridge circuit with a first thermocouple constituting a standard and the second having means to force an atmosphere to be tested therethrough. If a combustible gas is present, it combusts in the second enclosure and changes the output of the second thermocouple to cause bridge imbalance. However, in some applications this type of device is not sufficiently sensitive.

Yet another recently developed detection system utilizes a corona discharge and detects the presence of a combustible gas by measuring corona current which increases in the presence of a combustible gas. Although this system normally provides adequate detection, it is not as sensitive to extremely low concentration ranges of combustible gas as a hydrogen flame detector and therefore is inadequate in some situations.

Therefore, it is an object of this invention to provide a gas detector which is sensitive to low concentrations of combustible gas and gases containing atomic hydrogen in the atmosphere.

Still another object of this invention is to provide such a gas detector which has a relatively long life.

A detector constructed in accordance with this invention includes a sensor having a thin film of indium sesquioxide disposed thereon and a heating coil disposed closely adjacent to the thin film. Gases containing atomic hydrogen are decomposed on either the heating coil or the thin film to form free radicals of atomic hydrogen which are adsorbed by the indium sesquioxide causing a change in the electrical resistance of the thin film. Other combustible gases combust to cause a change in the resistivity of the thin film. Means are provided to measure the change in thin-film resistivity to thereby indicate the presence of a gas.

This invention has been pointed out with particularity in the appended claims. A more thorough understanding of the above objects and further advantages of this invention may be had by referring to the following detailed description taken in conjunction with the accompanying drawings wherein:

Figure 2:
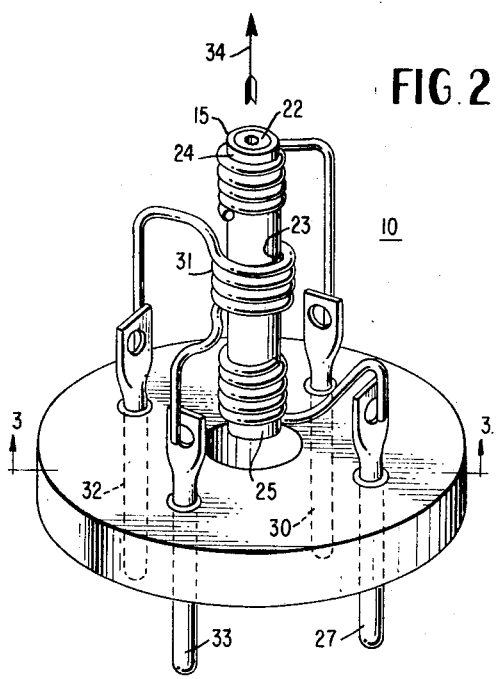
FIGURE 2 illustrates one embodiment of a sensor capable of being used in a detector shown in FIGURE 1 and constructed in accordance with this invention.
Figure 3:
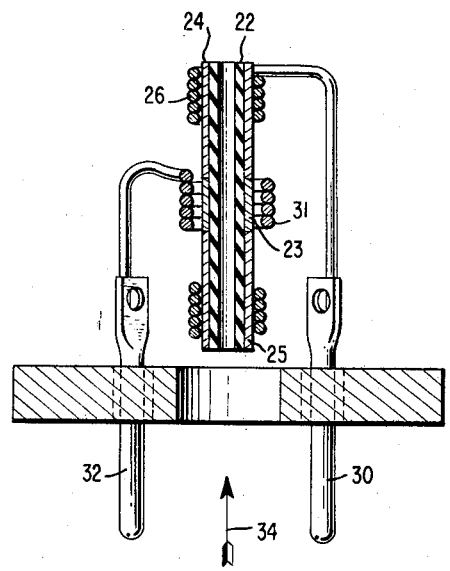
Figure 4:
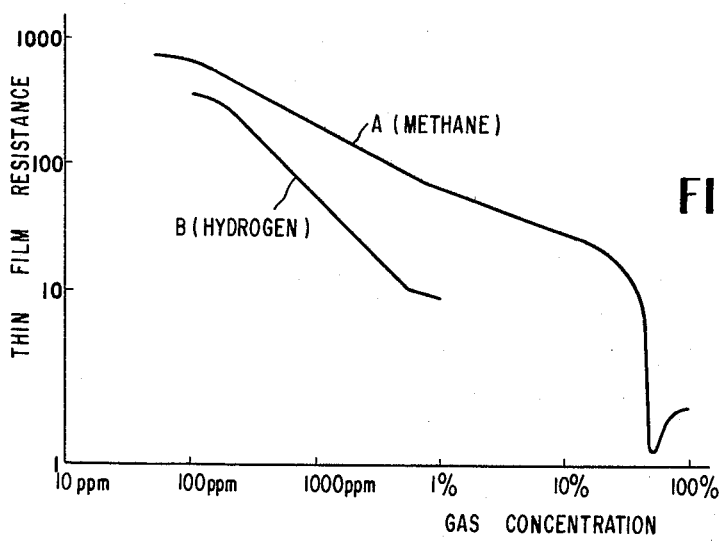

FIGURE 3 presents a sectional view of the sensor shown in FIGURE 2 taken along the lines 3—3; and FIGURE 4 illustrates the relationship between the resistance of the sensor and the concentration of two sample gases.

Figure 1:
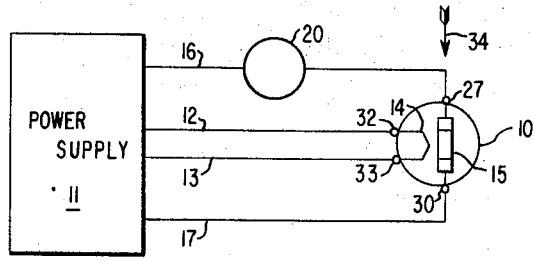
FIGURE 1 illustrates in schematic diagram a gas detector system utilizing a sensor formed in accordance with this invention.

Before discussing the structure and operation of the particular embodiment of this invention as illustrated in FIGURES 1-3, it would be best first to discuss its theory as it is now understood and applied to the detection of gases containing atomic hydrogen. $In_2O_3$, indium sesquioxide, is an n-type semiconductor below approximately 500° C. and is an intrinsic semiconductor above 500° C., that temperature being referred to as the transition temperature. When indium sesquioxide is heated to a constant temperature above its transition temperature in an atmosphere free of gases to be detected, it is sensitive to hydrogen. When hydrogen contacts the surface of indium sesquioxide in this intrinsic operating region, a reaction occurs whereby the hydrogen may be dissociated into atomic hydrogen or may form hydroxide ions. As the indium sesquioxide temperature has been raised by independent means, thermal energy produced by that means and the energy released by the reaction are sufficient to support a solid gas reaction between the atomic hydrogen or hydroxide ions and the indium sesquioxide whereby associated unpaired electrons are donated to the indium sesquioxide to cause an increase in the conductivity thereof.

If the hydrogen is subsequently removed, then the total energy provided by the heater and the reaction is reduced to a level which can no longer support the solid gas reaction. Therefore, the donated electrons are released from the indium sesquioxide and recombine with atomic hydrogen or the hydroxide ions in the area which then disperses. These reactions are therefore reversible and may be defined as:

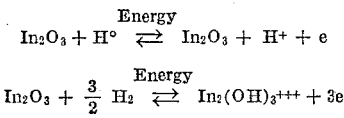

Before considering the reaction which occurs when any gas containing atomic hydrogen is applied to the sensor, the influences of other elements must be examined to see whether the conductivity changes are caused solely by the presence of such a gas. The only other elemental constituents of the atmosphere which can be adsorbed are nitrogen and oxygen. However, it has been found experimentally that neither nitrogen nor oxygen affects the conductivity of indium sesquioxide on an order which is comparable with the change induced by the presence of an atomic hydrogen-containing gas. Therefore, it can be said that any change caused in the resistivity of the indium sesquioxide thin film is caused by the presence of an atomic hydrogen-containing gas.

When such a gas other than molecular hydrogen is introduced to the sensor, it will cause a change in conductivity thereof if it can be decomposed to release atomic hydrogen. This decomposition can be done thermally by processes such as cracking or other methods well known in the art. For example, if a hydrocarbon gas, or other gases such as ammonia, is cracked on a hot catalytic surface, it will decompose into free radicals including atomic hydrogen which can be adsorbed.

Each of these reactions is best considered now by referring to the detailed drawings and considering the reactions in conjunction with these drawings. Referring to FIGURE 1, there is shown a sensor 10 which is connected to a power supply 11 to be energized thereby. Conductors 12 and 13 serve to provide a heating current produced by the power supply 11 to a heating coil, shown diagrammatically as a filament 14 disposed in close association with a sensing element 15. Another pair of conductors 16 and 17 serve to provide a potential across the sensing element 15, and a meter 20 shown in series with the conductor 16 and the sensing element 15 provides an indication of conductivity changes if the potential applied across the sensing element remains constant.

Now referring to FIGURES 2 and 3 together, the sensor 15 comprises a cylindrical support 22, formed of a dielectric material such as quartz, and a thin film 23 of indium sesquioxide ($In_2O_3$) deposited on a central portion of the support. There are several schemes for such deposition which do not affect sensitivity.

A preferred approach is that of evaporating indium sesquioxide from a platinum-iridium boat onto the support 22 in a vacuum at approximately 1400° C. After the support 22 is coated with a thin film, the sensors are preferably treated in a furnace at approximately 700° C. for about two hours to assure complete oxidation of the film. Then the sensors are treated in a gas oxygen torch. Use of this preferred method has provided sensors having sensitivities of less than 50 p.p.m. after a short warm-up period.

Other approaches include the evaporation of either indium or indium oxide from boats of other materials such as graphite. After the film is formed, it is treated in a gas oxygen flame. The various methods of forming the indium sesquioxide film have all produced sensors having sensitivities of substantially the same order of magnitude although some variation in warm-up time may be evident.

In order to measure changes in conductivity of the indium sesquioxide thin film 23, a pair of electrodes 24 and 25 are formed on the end portions of the cylindrical support 22. Although any noble metal electrode could be used, one particularly appropriate electrode is formed by coating the electrode areas of the cylindrical support with platinum. Connections to the power supply are provided by wrapping platinum wire 26 around each of the electrodes 24 and 25 and terminating these in terminal pins 27 and 30 which then serve to connect the electrodes 24 and 25 to the conductors 16 and 17.

The indium sesquioxide thin film is maintained at a constant temperature above its transition temperature in an atmosphere free of the gas to be detected by means of a heater coil 31 wrapped concentrically about and closely adjacent the indium sesquioxide thin film 23 but not in contact therewith. The heater coil 31 is then energized by connecting it to terminal pins 32 and 33 which are in turn connected to a constant current portion of the power supply 11 by conductors 12 and 13. In this embodiment the heater coil 31 is formed of a material which serves as a cracking catalyst such as platinum.

In a preferred embodiment, means, not shown, are provided to direct the gas to be tested in a direction parallel to the thin film surface and between the thin film and the heater coil. Such means are well known in the art, one example being the leak detector shown in Ser. No. 401,031 filed Oct. 2, 1961, by John A. Roberts (now U.S. Patent No. 3,302,449 issued Feb. 7, 1967) and assigned to the same assignee as the present invention. Such a means would cause the sampled gas to be directed in a direction indicated by the arrow 34.

With this structure and the outline of the theory presented above, the operation of the sensor 15 can now be explained in more detail. If a gas containing atomic hydrogen is directed across the sensor 15 in a direction shown by the arrow 34, the gas is apparently cracked on the hot platinum surface of the heater coil 31, causing the covalent bond of the gas to break in one of two possible manners. In one reaction, known in the art as homolysis, one electron could go to each atom joined by the bond. In a second type of reaction, known as heterolysis, the pair of electrons could stay with one or the other of the two atoms. However, the energy required for the heterolytical dissociation of the gas into two free ions is about three times that required for the homolytical dissociation into two free radicals or a free radical and hydrogen atom. Therefore, it is felt that homolytical dissociation occurs with the two free radicals being produced. As an example, methane is expected to decompose into a methyl radical and atomic hydrogen as follows:

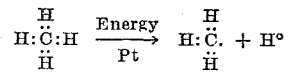

Similar results occur with other gases containing atomic hydrogen.

The atomic hydrogen is then in close association with the indium sesquioxide thin film 23 and reacts therewith as occurs when hydrogen is applied to the sensor to cause a change in the conductivity of the thin film 23 which indicates the presence of the gas.

A typical sensor has been constructed in accordance with this invention from a cylindrical support 22 constituted by a quartz tube having a 1.5 mm. outer diameter and a 0.5 mm. inner diameter. After depositing the platinum electrodes on the ends of the tube, indium sesquioxide was vacuum deposited on a central portion of the outside surface of the quartz tubing to a thickness from 100 to 10,000 angstrom units with an optimum thickness for such films being in the range of 500 to 3000 angstrom units. The heater coil 31 was made of a 15 mil platinum wire wrapped in a coil having a 2 mm. inside diameter. Platinum-clad nichrome wire has also been used successfully.

FIGURE 4 presents a graph showing the change in resistivity of a sensor elements 15 constructed as discussed above. Resistivity in this figure is plotted on an arbitrary logarithmic scale. It can be seen that the conductivity begins to increase (i.e., the resistivity begins to decrease) sufficiently to note a change at less than 50 parts per million (p.p.m.). It has been found experimentally that this type of sensor can detect methane concentrations from below 50 p.p.m. to 100%. Similarly, Graph B represents the sensitivity to hydrogen. These two gases exhibit a linear relationship between gas concentrations and thin-film resistivity on a logarithmic scale. Therefore, such a detector can be calibrated not only to indicate the presence of a gas containing atomic hydrogen, but also to provide a direct indication of the concentration of the gas over a substantial range of concentrations.

It has also been found that this sensor will detect other combustible gases such as carbon monoxide by utilizing the negative resistance-temperature curve of indium sesquioxide when it is maintained in the intrinsic conduction region as is known in the art. If a constant input of current is applied to the heater coil 31, a constant heat output is produced so the thin film temperature remains constant. However, that temperature is sufficiently high to cause combustion of the combustible gas which, in turn, tends to elevate the thin film temperature. As a result of the added heat input and increased thin film temperature, there is an increase of the thin film conductivity which indicates the presence of the combustible gas. Therefore, this sensor is not limited exclusively to the detection of atomic hydrogen gases; it may under certain applications be adapted to detect other combustible gases.

In summary, this invention presents a solid state sensor for detecting the presence of any combustible gas in the atmosphere through a complete range of concentrations, such a sensor being particularly sensitive to low concentrations of atomic hydrogen-containing gases. The sensor consists of an indium sesquioxide thin film and an external heating element, the heating element maintaining the thin film above its transition temperature at a substantially constant value and serving to crack the atomic hydrogen-containing gases to dissociate atomic hydrogen therefrom which then reacts with the indium sesquioxide film to increase the conductivity thereof. Other combustible gases then combust in proximity to the thin film to increase its temperature and conductivity. Detection is then easily accomplished merely by monitoring changes in the conductivity of the thin film. Such a sensor has been found to have a higher sensitivity to hydrocarbon gases than either the hot wire or corona discharge sensors of the prior art and the same sensitivity as a flame ionization detector. However, this detector does not require the presence of hydrogen gas sources and further can be used to measure concentrations exceeding the lower explosive limits. Furthermore, when compared to the hydrogen flame detector, the indium sesquioxide thin film detector is more simply constructed.

Furthermore, the sensor operates on the theory of cracking a gas to dissociate atomic hydrogen therefrom; therefore, it will be obvious to those skilled in the art that the detector need not be used merely to detect combustible gases or hydrocarbon gases. Rather, the sensor is sensitive to any gas containing atomic hydrogen such as ammonia.

It will therefore be obvious to those skilled in the art that many modifications can be made to a gas detector such as described in this invention. While only a single embodiment of this invention has been shown herein, the appended claims are intended to cover all such equivalent variations which come within the true spirit and scope of this invention.

What is claimed as new and desired to be secured by Letters Patent of the United States is:

1. A sensor for detecting the presence of a combustible gas containing atomic hydrogen comprising:
   (a) a cylindrical dielectric support means;
   (b) a thin indium sesquioxide film disposed on a central portion of said support means, said indium sesquioxide being an intrinsic semiconductor above a predetermined temperature;
   (c) first and second spaced noble metal electrodes disposed on the end portions of said support means in contact with said thin film;
   (d) terminal means on said support means connected to said first and second electrodes and adapted to be connected to a means for sensing thin film conductivity changes to indicate the presence of a gas; and
   (e) heater means for providing a substantially constant heat input to said thin film to thereby maintain said thin film as an intrinsic semiconductor at a temperature above said predetermined temperature, said heater means being constituted by a heater coil formed of a catalytic cracking material wrapped concentrically with said support means and spaced therefrom and means adapted to connect said heater coil to an energy source to energize said heater coil.

2. A gas detector for detecting a combustible gas containing atomic hydrogen comprising:
   (a) a cylindrical dielectric support means;
   (b) a thin indium sesquioxide film disposed on a portion of said support means, said indium sesquioxide being an intrinsic semiconductor above a predetermined temperature;
   (c) first and second spaced noble metal electrodes on said support means in contact with said thin film;
   (d) means connected to said electrodes for measuring changes in conductivity of said thin film in the presence of a gas to be detected; and
   (e) heater means for providing a substantially constant heat input to said thin film to maintain said thin film as an intrinsic semiconductor above said predetermined temperature, said heater means comprising a platinum heater coil wrapped concentrically about said support means and spaced from said thin film.

3. A detector as recited in claim 2 wherein said thin film has a final thickness in the range from 100 to 10,000 angstrom units.

4. A detector as recited in claim 3 wherein said thin film thickness is in the range from 500 to 3,000 angstrom units.

References Cited

UNITED STATES PATENTS 2,508,588   5/1950   Waltman.

CHARLES A. RUEHL, Primary Examiner

J. K. LUNSFORD, Assistant Examiner

U.S. Cl. X.R.

73—27